(12) United States Patent
Omori et al.

(10) Patent No.: US 7,973,448 B2
(45) Date of Patent: Jul. 5, 2011

(54) BRUSH HOLDER AND METHOD FOR MANUFACTURING BRUSH HOLDER

(75) Inventors: Shingo Omori, Toyohashi (JP); Nobuo Mizutani, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 12/412,625

(22) Filed: Mar. 27, 2009

(65) Prior Publication Data
US 2009/0243425 A1 Oct. 1, 2009

(30) Foreign Application Priority Data

Mar. 28, 2008 (JP) .................. 2008-086227

(51) Int. Cl.
*H02K 13/00* (2006.01)
*H01R 39/38* (2006.01)

(52) U.S. Cl. ........ 310/239; 310/241; 310/242; 310/234; 310/244; 310/245; 310/246

(58) Field of Classification Search ........... 310/239–246
See application file for complete search history.

(56) References Cited

U.S. PATENT DOCUMENTS

| 5,453,646 | A | | 9/1995 | Gleixner et al. | |
|---|---|---|---|---|---|
| 6,104,110 | A | * | 8/2000 | Uchida et al. | 310/51 |
| 6,326,716 | B1 | * | 12/2001 | Niimi et al. | 310/239 |
| 7,511,393 | B2 | * | 3/2009 | Mizutani | 310/68 R |
| 2002/0030414 | A1 | * | 3/2002 | Mizutani et al. | 310/51 |
| 2006/0163958 | A1 | * | 7/2006 | Yagi et al. | 310/71 |
| 2006/0244321 | A1 | * | 11/2006 | Mizutani | 310/68 R |
| 2007/0210672 | A1 | * | 9/2007 | Fleminger et al. | 310/239 |
| 2010/0033053 | A1 | * | 2/2010 | Kimura et al. | 310/239 |

FOREIGN PATENT DOCUMENTS

JP 2003-79109 3/2004

* cited by examiner

*Primary Examiner* — Quyen Leung
*Assistant Examiner* — Terrance Kenerly
(74) *Attorney, Agent, or Firm* — Pearl Cohen Zedek Latzer, LLP (57) ABSTRACT

A brush holder having brush holding portions and coil holding portions is disclosed. Each brush holding portion holds a brush such that the brush is slidable on a commutator attached to a rotary shaft. Each coil holding portion holds a choke coil electrically connected to one of the coils. The brush holder includes a holder base member and brush holding members that are assembled to the holder base member so as to form the brush holding portions. Each brush holding member includes a coil supporting portion, which forms the coil holding portion between the corresponding brush holding member and the holder base member.

4 Claims, 7 Drawing Sheets

BRUSH HOLDER AND METHOD FOR MANUFACTURING BRUSH HOLDER

RELATED APPLICATION DATA

The present application claims benefit of prior Japanese application 2008-086227, filed Mar. 28, 2008, incorporated by reference herein in its entirety.

FIELD OF THE INVENTION

The present invention relates to a brush holder and a method for manufacturing a brush holder.

BACKGROUND OF THE INVENTION

Conventionally, brush holders that integrally hold brushes and electrical components such as choke coils and capacitors connected to the brushes have been known. For example, Japanese Laid-Open Patent Publication No. 2003-79109 discloses a brush holder that has two cylindrical accommodating portions each being capable of accommodating a choke coil. A pair of brush holding portions are arranged on opposite sides of a rotary shaft, and each accommodating portion is located in the vicinity of one of the brush holding portions. Each accommodating portion accommodates a choke coil, which is pressed by an elastic member provided in the wall of the accommodating portion, so as to be elastically held in the accommodating portion.

The brush holder of the above publication does not make the assembly of the choke coils to the accommodating portions troublesome. Also, compared to a case where choke coils are simply welded to, for example, terminals, the brush holder of the above publication holds choke coils in a more reliably manner. Further, the brush holder of the above publication reduces the stress acting on pigtails that connect the choke coils and the brushes to each other.

However, when taking into account the influence of vibrations on the motor after it is mounted on a vehicle, the above described structure for assembling choke coils to the accommodating portions is not sufficient for reliably holding the choke coils. Further, when taking into account the procedure for connecting brushes and electrical components, the assembling method still has room for improvement. Also, there have been strong demands for a method for reliably fixing the choke coils (electrical components) and facilitating the assembly.

SUMMARY OF THE INVENTION

Accordingly, it is an objective of the present invention to provide a brush holder that reliably holds electrical components and facilitates the assembly, and a method for manufacturing the brush holder.

To achieve the foregoing objective and in accordance with a first aspect of the present invention, a brush holder including a brush holding portion, an electrical component holding portion, a holder base member, and a brush holding member is provided. The brush holding portion holds a brush such that the brush is slidable on a commutator attached to a rotary shaft. The electrical component holding portion holds an electrical component electrically connected to the brush. The brush holding member is assembled to the holder base member so as to form the brush holding portion. The brush holding member includes an electrical component supporting portion. The electrical component supporting portion forms the electrical component holding portion between the brush holding member and the holder base member.

In accordance with a second aspect of the present invention, a method for manufacturing a brush holder is provided. The brush holder includes a brush holding portion and an electrical component holding portion. The brush holding portion holds a brush such that the brush is slidable on a commutator attached to a rotary shaft. The electrical component holding portion holds an electrical component electrically connected to the brush. The method includes: arranging the brush and the electrical component in a holder base member; preparing a brush holding portion that has a sliding portion, on which the brush is slidable, and an electrical component supporting portion for supporting an electrical component electrically connected to the brush; and assembling the brush holding member to the holder base member, thereby simultaneously forming the brush holding portion and the electrical component holding portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a preferred embodiment according to the present invention will be described.

Figure 1:
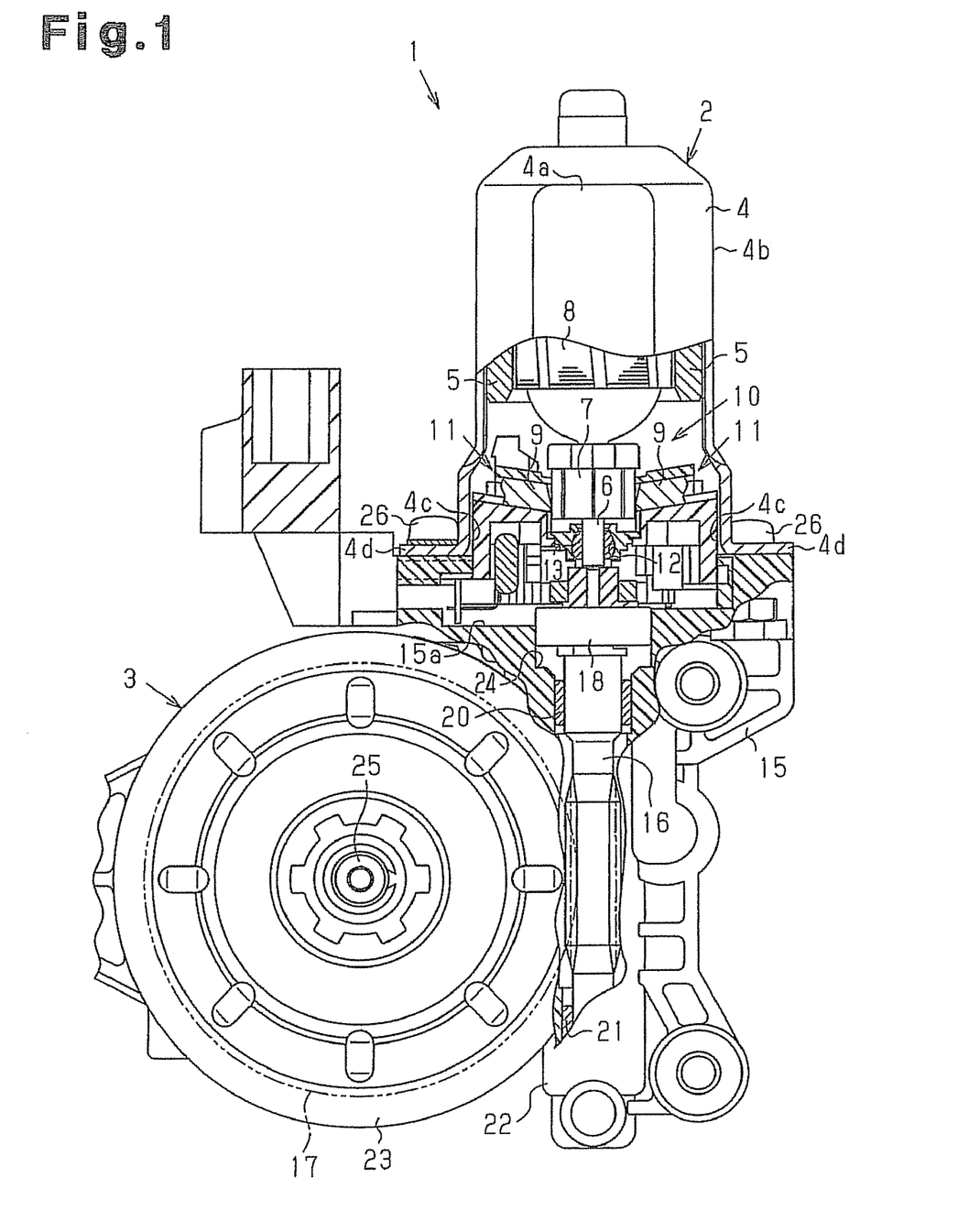
FIG. 1 is a schematic cross-sectional view illustrating a motor having a brush holder according to one embodiment of the present invention.

A direct-current motor 1 shown in FIG. 1 is used as a drive source of a power window apparatus mounted on a vehicle. The motor 1 includes a motor main body 2 and a speed reducing portion 3. The motor main body 2 includes a yoke housing 4, which forms the outer shell of the motor main body 2.

The yoke housing 4 is a flat cylinder with a bottom. The yoke housing 4 includes a pair of flat walls 4a arranged parallel to each other, and curved walls 4b, which connect the flat walls 4a to each other. A pair of magnets 5 are fixed to the inner surfaces of the curved walls 4b. The yoke housing 4 rotatably accommodates an armature 8. The armature 8 is located between the pair of magnets 5. The armature 8 includes a rotary shaft 6 and a commutator 7 fixed to the rotary shaft 6.

In the present embodiment, the commutator 7 is fixed at a position in the vicinity of the distal end of the rotary shaft 6 (the lower end of the rotary shaft 6 as viewed in FIG. 1), so as to be located near the opening of the yoke housing 4. A brush holder 10 is fixed to the opening of the yoke housing 4. The brush holder 10 holds a pair of brushes 9, which slide on the commutator 7.

A pair of flanges 4*d* are formed at the opening 4*c* of the yoke housing 4. The flanges 4*d* extend from the curved walls 4*b* radially outward of the yoke housing 4. The brush holder 10 is fastened to the flanges 4*d* so as to substantially cover the opening 4*c* of the yoke housing 4. That is, the brush holder 10 is fixed to the yoke housing 4. The brushes 9 are held by a pair of brush holding portions 11 formed in the brush holder 10, and are urged by elastic members (not shown) toward the rotary shaft 6, so that the distal ends of the brushes 9 slide on the commutator 7.

The brush holder 10 has a through hole 12 for receiving the rotary shaft 6. A pair of bearings 13 are provided at a center of the bottom of the yoke housing 4 and the through hole 12 of the brush holder 10, respectively. Portions of the rotary shafts 6 in the vicinity of the proximal end (the upper end of the rotary shaft 6 as viewed in FIG. 1) and the distal end are each supported by the corresponding bearing 13, so that the armature 8 is rotatably accommodated in the yoke housing 4.

The speed reducing portion 3 includes a gear housing 15 forming the outer shell of the speed reducing portion 3, a worm shaft 16 and a worm wheel 17, which are accommodated in the gear housing 15, and a clutch 18 that couples the worm shaft 16 and the rotary shaft 6 to each other such that torque can be transmitted therebetween. The worm shaft 16 and the worm wheel 17 form a speed reducing mechanism. The worm shaft 16 functions as an input portion of the speed reducing mechanism, while the rotary shaft 6 functions as an output portion of the motor main body 2.

The clutch 18 transmits drive force sent from the rotary shaft 6 to the worm shaft 16 and locks the worm shaft 16 against rotation so that drive force sent from the worm shaft 16 is not transmitted to the rotary shaft 6. As a result, the motor 1 is prevented from being rotated by reaction torque from the load side, that is, an output shaft 25, which will be discussed below.

The gear housing 15 of the present embodiment is made of resin. The gear housing 15 has a predetermined shape to accommodate the worm shaft 16, the worm wheel 17, and the clutch 18. Specifically, the worm shaft 16 is rotatably supported in a worm shaft accommodating portion by bearings 20, 21. The worm shaft 16 meshes with the worm wheel 17 accommodated in a wheel accommodating portion 23. The clutch 18 is coupled to the proximal end of the worm shaft 16, and is accommodated in a clutch accommodating portion 24 formed at a position axially adjacent to the worm shaft accommodating portion 22.

The wheel accommodating portion 23 is adjacent to the worm shaft accommodating portion 22, and is shaped like a flat cylinder. The worm wheel 17 is coupled to the output shaft 25. The output shaft 25 protrudes to the outside of the wheel accommodating portion 23 from a substantially center of the disk shaped lid (bottom) of the wheel accommodating portion 23. The output shaft 25 is coupled to a wire type regulator (not shown), which selectively opens and closes a vehicle window glass (not shown).

Also, the gear housing 15 has an opening 15*a* in the axial direction of the worm shaft 16. An axial end of the clutch 18 is exposed through the opening 15*a*. The gear housing 15 is coupled to the yoke housing 4 such that the opening 15*a* of the gear housing 15 faces the opening 4*c* of the yoke housing 4. In the present embodiment, the yoke housing 4 and the gear housing 15 are fastened to each other by bolts 26, such that the brush holder 10 is located between the yoke housing 4 and the gear housing 15. The rotary shaft 6 is inserted in the clutch accommodating portion 24 through the opening 15*a*. The distal end of the rotary shaft 6 is connected to the clutch 18, so that the speed reducing portion 3 and the motor main body 2 are operatively connected to each other.

The configuration of the brush holder 10 according to the present embodiment will hereafter be described.

Figure 2A:
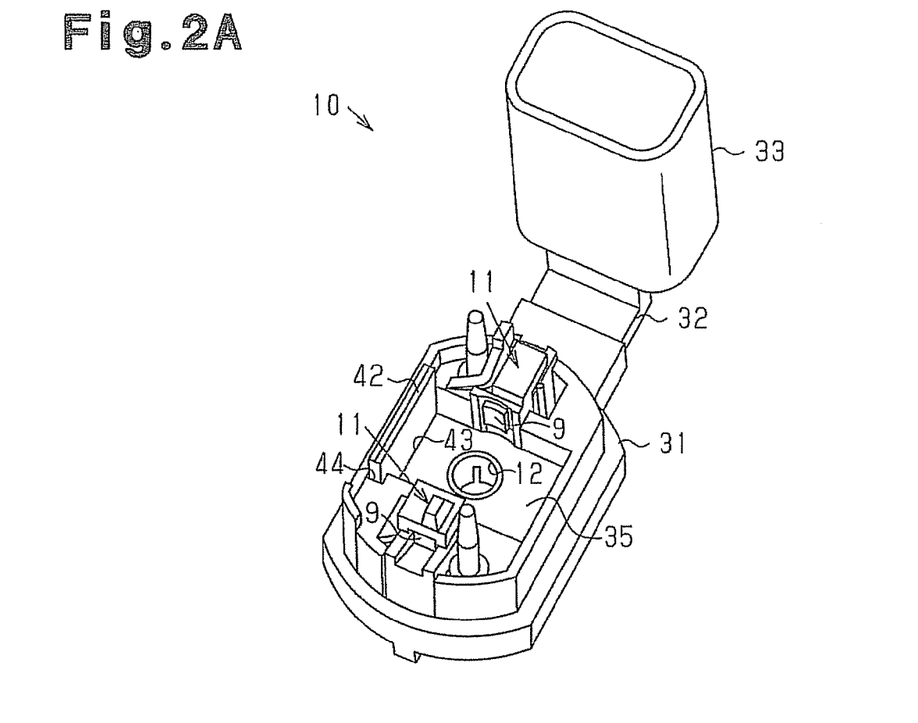
FIGS. 2A and 2B are perspective views illustrating the brush holder of the motor shown in FIG. 1.
Figure 2B:
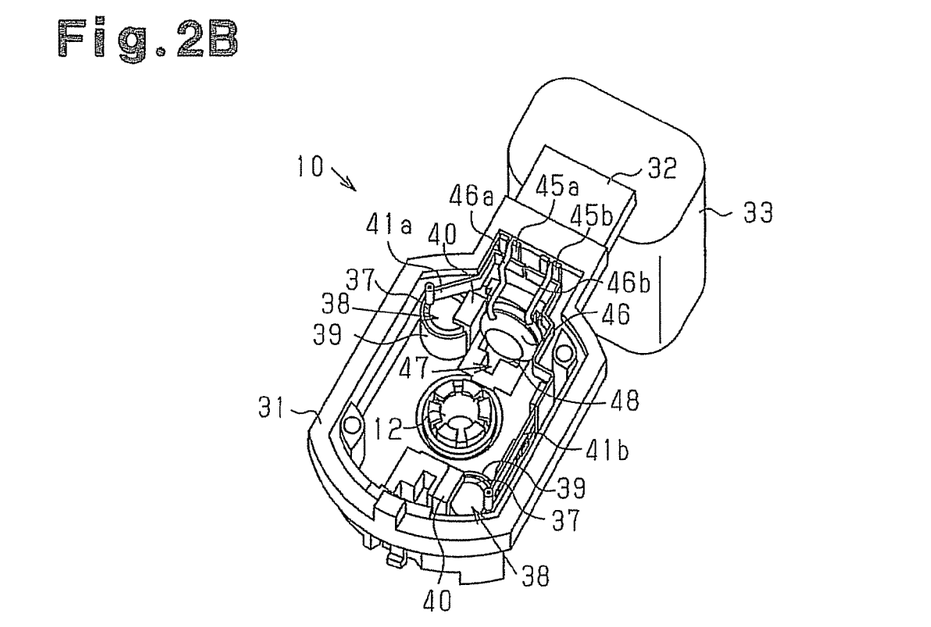

As shown in FIGS. 2A and 2B, the brush holder 10 is shaped to have a substantially flat circular shape in accordance with the cross-sectional shape of the yoke housing 4. The brush holder 10 includes a holder portion 31, an extended portion 32 extending radially outward from the holder portion 31, and a substantially cylindrical feeder portion 33 provided at the distal end of the extended portion 32. Part of the holder portion 31 is inserted in the yoke housing 4.

Figure 4:
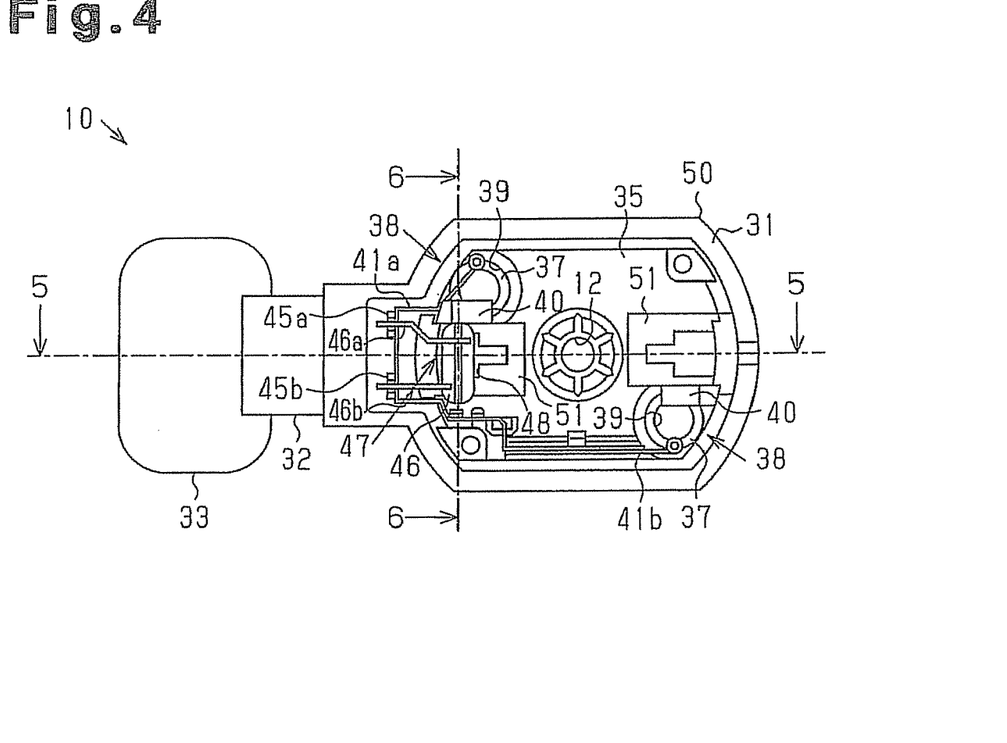
FIG. 4 is a plan view illustrating the brush holder shown in FIGS. 2A and 2B.
Figure 5:
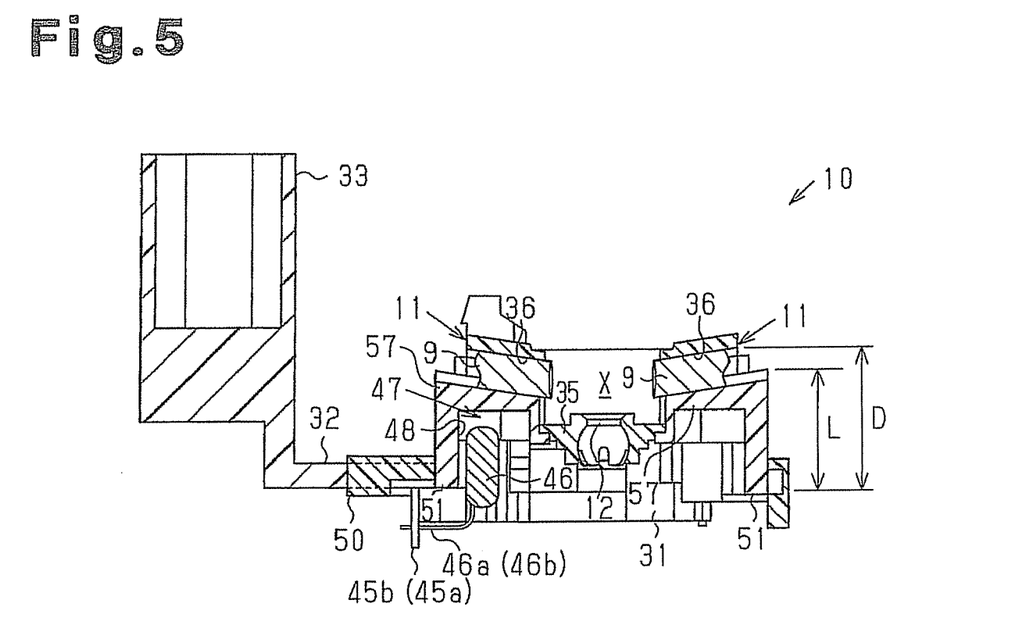
FIG. 5 is a cross-sectional view taken along line 5-5 of FIG. 4, showing the brush holder.

Specifically, as shown in FIGS. 4 and 5, the through hole 12, through which the rotary shaft 6 extends, is located at a substantially center portion of the holder portion 31 in the brush holder 10, and the pair of the brush holding portions 11 provided on both sides of the through hole 12. Specifically, the holder portion 31 has a base 35 located in the yoke housing 4. The through hole 12 is formed in the base 35. The pair of the brush holding portions 11 arranged to be axially spaced from the base 35, such that the brush holding portions 11 are further inward of the yoke housing 4 than the base 35, that is, located above the base 35 as viewed in FIG. 1. Each brush holding portion 11 has a cylindrical portion 36 to hold the corresponding brush 9. Each cylindrical portion 36 opens toward an accommodating space X for accommodating the commutator 7, and extends along the longitudinal direction of the holder portion 31.

As shown in FIGS. 2A, 2B, 4, and 6, a coil holding portion 38 is provided in the vicinity of each brush holding portion 11. Each coil holding portion 38 functions as an electrical component holding portion for holding a choke coil 37, which is an electrical component connected to the corresponding brush 9. In the present embodiment, the base 35 of the holder portion 31 has cylindrical coil accommodation portions 39 for accommodating one of the choke coils 37. The coil accommodating portions 39 are formed on a surface of the base 35 that faces the speed reducing portion 3 (the surface shown in FIG. 4). A coil supporting portion 40, which functions as an electrical component supporting portion, extends from a corresponding position of each brush holding portion 11 to a position above the open end of the corresponding coil accommodating portion 39. In the present embodiment, each coil holding portion 38 and the corresponding coil supporting portions 40 hold one of the choke coils 37 accommodated in the corresponding coil accommodating portion 39, which functions as an electrical component accommodating portion.

The brushes 9 and the choke coils 37 are connected to terminals 41*a*, 41*b*, which are arranged on the surface that faces the speed reducing portion 3 (surfaces shown in FIG. 4). The terminals 41*a*, 41*b* are each formed by bending a metal plate. Each of the terminals 41*a*, 41*b* extend along the circumference of the holder 31 to a position near the extended portion 32 of the holder portion 31. In the present embodiment, the terminal 41*b* is connected to a thermistor (PTC) 42.

The thermistor 42 is inserted in a slit 43 formed in the holder portion 31, and held in a thermistor holding portion 44 formed in a portion close to the yoke housing 4. Feeder terminals 45a, 45b, which extend from the feeder portion 33, are embedded in a portion of the holder portion 31 close to the extended portion 32. One end of each of the feeder terminals 45a, 45b projects from a surface facing the speed reducing portion 3 (the surface shown in FIG. 4) of the holder portion 31. Ends of the terminals 41a, 41b are electrically connected to the feeder terminals 45a, 45b.

In the present embodiment, the feeder terminals 45a, 45b are connected to a capacitor 46, which is an electrical component as shown in FIGS. 4 to 7. The base 35 of the holder portion 31 has a capacitor holding portion 47, which is a second electrical component holding portion. The capacitor holding portion 47 is formed on a surface of the base 35 that faces the speed reducing portion 3 (a surface shown in FIG. 4). Specifically, an accommodating recess 48 is formed in a position that corresponds to one of the brush holding portions 11 in the present embodiment. The capacitor 46 has connecting wires 46a, 46b connected to the feeder terminals 45a, 45b, and is accommodated in the accommodating recess 48 while being supported by the connecting wires 46a, 46b. That is, the accommodating recess 48 form the capacitor holding portion 47. A plurality of wall portions that define the accommodating recess 48 restrict the movement of the capacitor 46. Accordingly, stress acting on the capacitor 46 due to, for example, vibrations is lessened.

The method for manufacturing the brush holder 10 will now be described.

Figure 3:
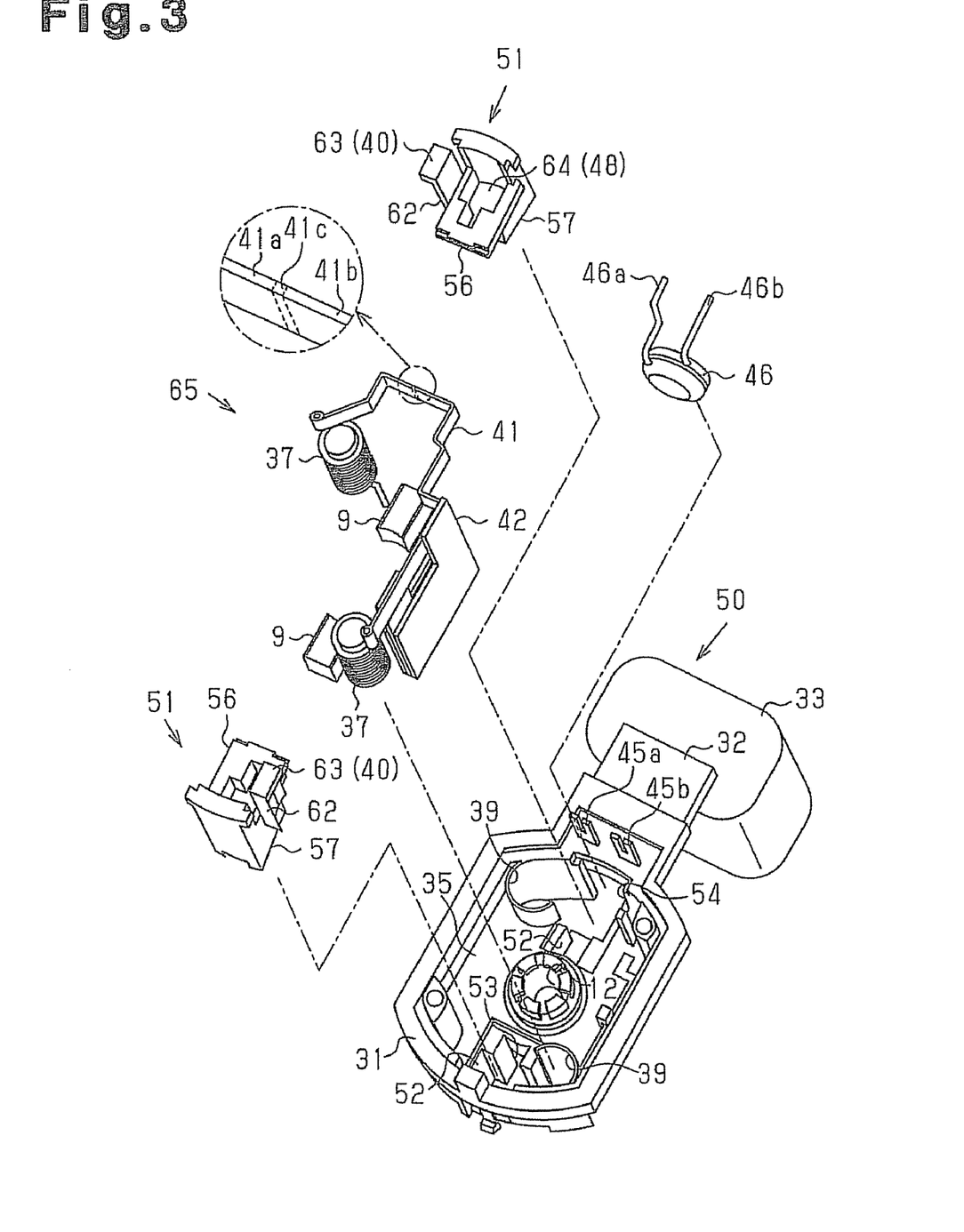
FIG. 3 is an exploded perspective view illustrating the brush holder shown in FIGS. 2A and 2B.

As shown in FIG. 3, the brush holder 10 includes a brush holder main body 50, which is a holder base member. The brush holding portions 11 are formed by assembling a pair of brush holding members 51 to the brush holder main body 50. In the present embodiment, the brush holder main body 50 and the brush holding members 51 are formed of resin. Also, in the present embodiment, each brush holding member 51 is integrally formed with the above described coil supporting portion 40. Thus, when the brush holding members 51 are assembled, the brush holding portions 11 and the coil holding portions 38 are simultaneously formed.

Specifically, as shown in FIG. 3, two recesses 52 are formed in a surface of the base 35 of the brush holder main body 50 that faces the speed reducing portion 3 (surface shown in FIG. 4). The recesses 52 each receive one of the brush holding members 51. Each recess 52 form a first opening 53, which communicates with the accommodating space X. Further, each recess 52 forms a second opening 54 facing the yoke housing 4 of the base 35. Each brush 9 is pressed toward the commutator 7 by an elastic member (not shown) through the corresponding second opening 54.

Figure 8:
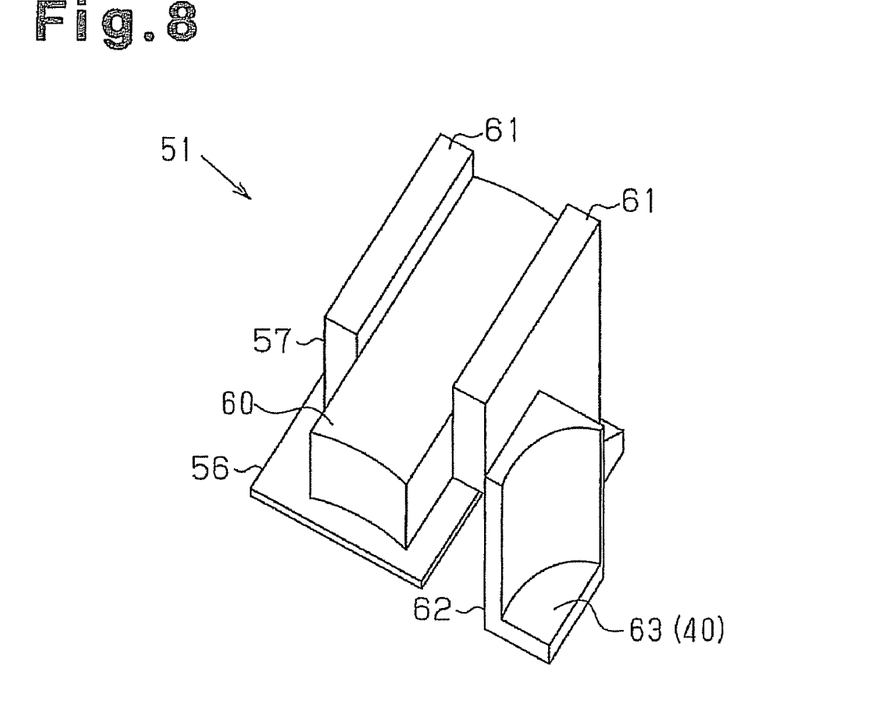
FIG. 8 is a perspective view illustrating the brush holder shown in FIG. 4.

As shown in FIG. 8, each of the pair of the brush holding members 51 has a plate-like lid portion 56 and a pair of upright insertion portions 57 formed on the lid portion 56. The lid portion 56 substantially has the same shape as the opening of the corresponding recess 52 (see FIG. 3). As shown in FIGS. 3 to 6, the insertion portion 57 of each brush holding member 51 is inserted in the corresponding recess 52, so that the recess 52 is covered by the lid portion 56. The brush holding members 51 are assembled to the brush holder main body 50 along the axis of the rotary shaft 6. In the present embodiment, the brush holding members 51 are press fitted to the brush holder main body 50 so as to be assembled to the brush holder main body 50.

Figure 6:
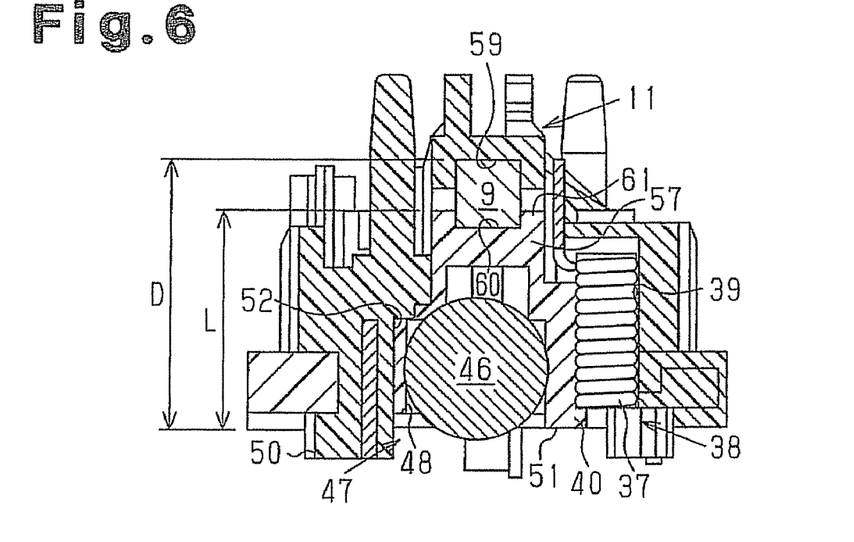
FIG. 6 is a cross-sectional view taken along line 6-6 of FIG. 4, showing the brush holder.
Figure 7:
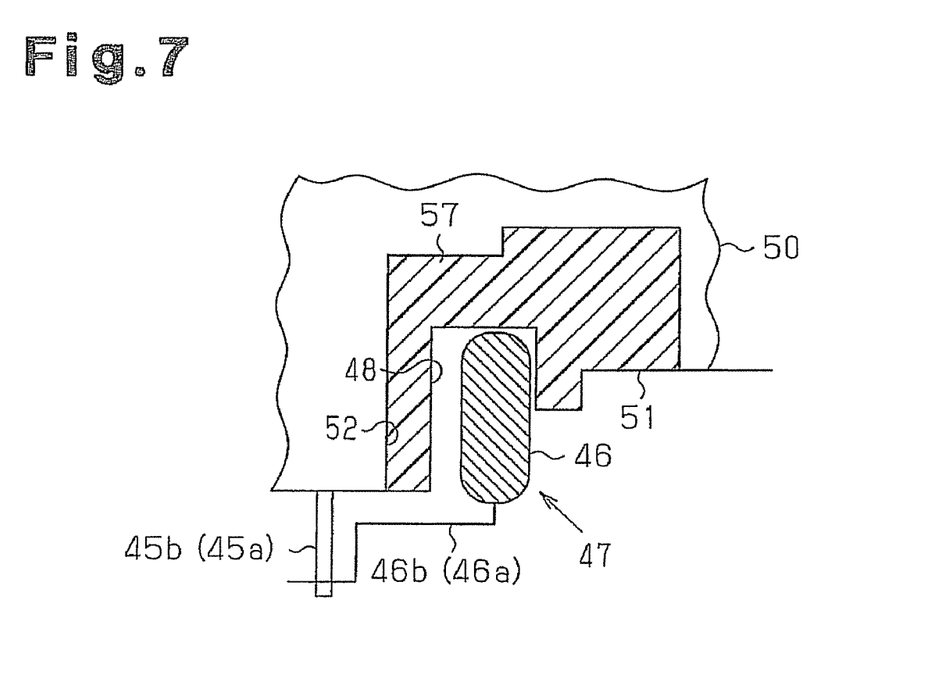
FIG. 7 is a cross-sectional view showing a capacitor holding portion of the brush holder shown in FIG. 4.

As shown in FIGS. 5 and 6, the insertion length L of the insertion portion 57 of each brush holding member 51 is shorter than the depth D of the recesses 52 formed in the brush holder main body 50 in the present embodiment. In the brush holder 10 of the present embodiment, the cylindrical portion 36 of each brush holding portion 11 is formed by a gap between the corresponding insertion portion 57 and the corresponding recess 52, and the corresponding first opening 53 communicating with the accommodating space X for the commutator 7 (and the second opening 54, see FIG. 3).

Specifically, as shown in FIG. 6, a holding groove 59 having a channel-shaped cross section is formed in the bottom of each recess 52. The distal end of the insertion portion 57 of each brush holding member 51 is inserted into the corresponding recess 52. A sliding surface 60 and a guide portions 61 are formed in the distal end of the insertion portion 57 (see FIG. 8). The sliding surface 60 serves as a sliding portion on which the brush 9 is slidable. The guide portions 61 extends along the longitudinal direction of the sliding surface 60. In the present embodiment, the brushes 9 are arranged in the holding grooves 59 so as to be slidable on the sliding surfaces 60, so that the brushes 9 are slidable on the commutator 7.

As shown in FIGS. 3 and 8, the second opening 54 formed in each recess 52 is formed by removing a part of the corresponding cylindrical coil accommodating portion 39 in the present embodiment. Each brush holding member 51 includes an arcuate wall portion 62. The arcuate wall portion 62 covers a part of the corresponding recess 52. In the present embodiment, a flange 63 is formed at the distal end of each arcuate wall portion 62. The flange 63 forms the coil supporting portion 40, which extends radially inward of the coil accommodating portion 39 at the open end of the coil accommodating portion 39.

Further, in the present embodiment, each brush holding member 51 has a lightening portion 64 formed in the lid portion 56. The lightening portion 64 opens to a side opposite to the side where the insertion portions 57 are formed (see FIG. 3). When the brush holding members 51 are assembled to the brush holder main body 50, the lightening portions 64 each form an accommodating recess 48 that forms the above described capacitor holding portion 47.

That is, in the manufacturing procedure of the brush holder 10 according to the present embodiment, the brushes 9, the choke coils 37, the thermistor 42, and the terminals 41a, 41b connecting these components are assembled to the brush holder main body 50 as shown in FIG. 3.

In the present embodiment, the brushes 9, the choke coils 37, and the thermistor 42 are connected to a terminal base member 41 to form a brush S/A 65. The brush S/A 65 is assembled to the brush holder main body 50 along the axial direction of the rotary shaft 6. Then, after the terminal base member 41 is welded to the feeder terminals 45a, 45b, the terminal base member 41 is separated at a separation portion 41c located between the feeder terminals 45a, 45b, so that the terminals 41a, 41b are formed.

Then, the pair of the brushes 9 are each arranged in the corresponding recess 52. With the choke coils 37 accommodated in the coil accommodating portions 39, the brush holding members 51 are assembled to the brush holder main body 50, so that the brush holding portions 11 and the coil holding portions 38 are formed simultaneously. Thereafter, with the capacitor 46 inserted in the capacitor holding portion 47, the connecting wires 46a, 46b are welded to the feeder terminals 45a, 45b, respectively.

The present embodiment has the following advantages.

(1) The brush holding portions 11 are formed by assembling the holding members 51 to the brush holder main body 50, which is a holder base member. Each brush holding member 51 has the integrally formed coil supporting portion 40, which supports the corresponding choke coil 37 at a position between the brush holding member 51 and the corresponding coil accommodating portion 39 formed in the brush holder main body 50. When the brush holding members 51 are assembled to the brush holder main body 50, the brush holding portions 11 and the coil holding portions 38 are formed simultaneously.

The above described configuration allows the choke coils 37, which are electrical components, to be reliably held without complicating the assembling procedure. Also, the brush holding portions 11 and the coil holding portions 38 are formed simultaneously by combining two members, which adds to the flexibility of design of the brush holding portions 11. Conventionally, when integrally forming the base 35 of the holder portion 31, in which the through hole 12 for receiving the rotary shaft 6 is formed, and the brush holding portions 11 of resin, the mold, for example, requires slide cores for forming the cylindrical portions 36 forming the brush holding portions 11. The space between the holder portion 31 and the feeder portion 33 needs to be wide in order to allow the slide cores to move. This increases the size of the motor. However, the above described embodiment eliminates the necessity for such slide cores. As a result, the space between the holder portion 31 and the feeder portion 33 can be reduced. This reduces the size of the motor. Also, each brush 9, an electrical components such as the choke coil 37, and the terminal 41a, 41b connecting these components can be easily made as an assembly. By integrally assembling these components, the installation is further facilitated.

(2) Each brush holding member 51 is assembled to the brush holder main body 50 along the axial direction of the rotary shaft 6. When each coil holding portion 38 is assembled, the corresponding choke coil 37 is held by the corresponding coil accommodating portion 39 formed in the brush holder main body 50 and the corresponding coil supporting portion 40 formed in the brush holding member 51.

That is, to facilitate the molding and to reduce the size, an accommodating portion for a choke coil is in general formed to have an opening facing in the axial direction of the rotary shaft 6. It is thus important to restrict the movement of the choke coil along the axial direction. In this respect, since axial movement of the choke coils 37 is restricted in the present embodiment, the choke coils 37 is held in a reliable manner.

(3) Each brush holding member 51 has the sliding surface 60, which functions as a sliding portion, on which the brush 9 held by the corresponding brush holding portion 11 can slide. The sliding surface 60 is formed in an advancing side in the direction along which the brush holding member 51 is assembled to the brush holder main body 50. On the trailing side of the brush holding member 51 in a direction along which the brush holding member 51 is assembled to the brush holder main body 50, the lightening portion 64, which forms the capacitor holding portion 47 (the accommodating recess 48), or a second electronic component holding portion, is formed. That is, the capacitor holding portion 47 is formed in a portion on the opposite side to the sliding surfaces 60 of the brush holding members 51.

The capacitor holding portion 47 having the above described configuration can easily reduce the stress acting on the capacitor 46 with a simple structure, also reduces the required space.

The present embodiment may be modified as follows.

Figure 9:
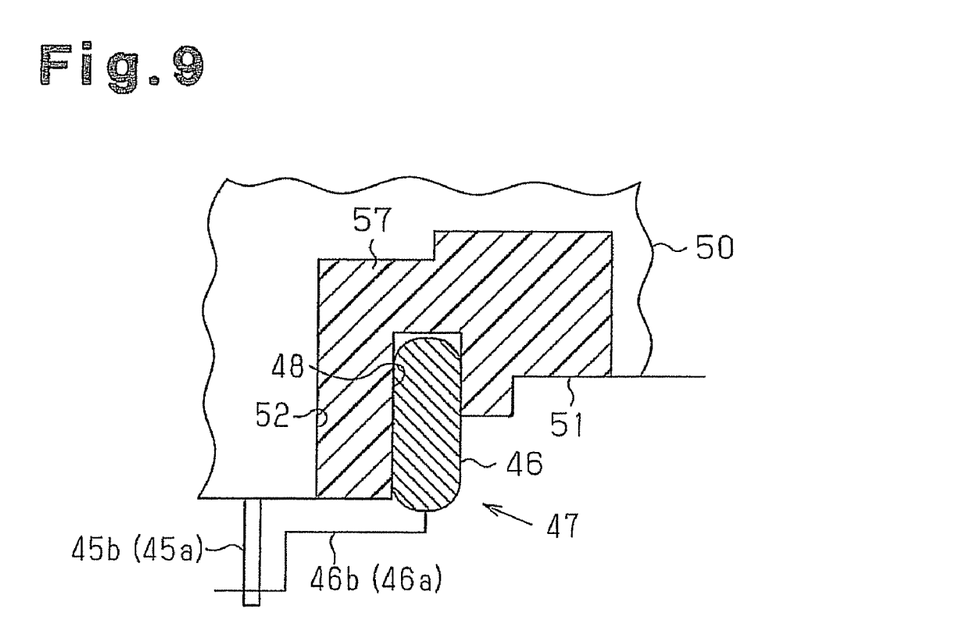
FIG. 9 is a cross-sectional view illustrating a capacitor holding portion according to a modified embodiment.

As shown in FIG. 9, the accommodating recess 48 forming the capacitor holding portion 47 may be structured such that there is no clearance between wall portions defining the accommodating recess 48 and the capacitor 46. This prevents the capacitor 46 from colliding with the wall portions.

Figure 10:
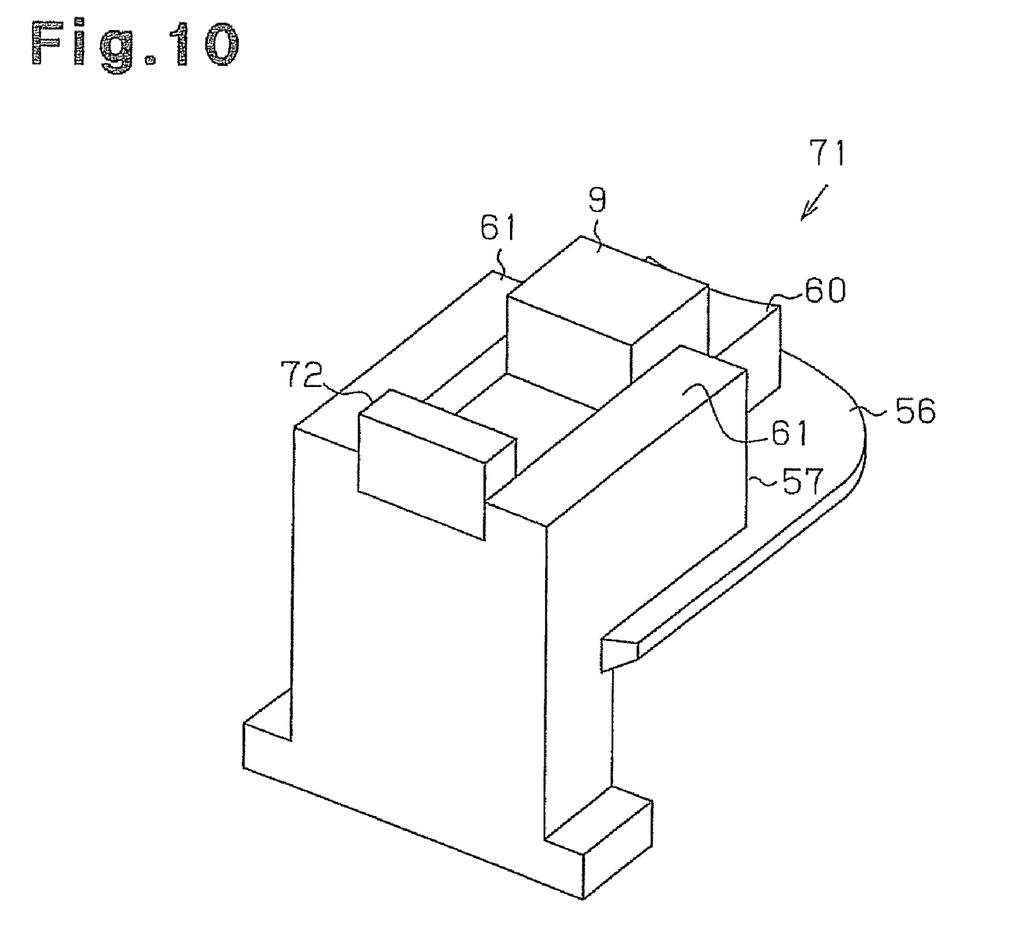
FIG. 10 is a perspective view illustrating a brush holding member according to another modified embodiment.

As in a brush holding member 71 shown in FIG. 10, a retaining portion 72 may be formed on the sliding surface 60. The retaining portion 72 restricts the movement of the brush 9 to a side opposite to the accommodating space X, which accommodates the commutator 7. Accordingly, the brush 9 is prevented from coming off from the side opposite to the accommodating space X for the commutator 7.

In the embodiment of FIGS. 1 to 8, the coil holding portions 38 function as electrical component holding portions, and the capacitor holding portion 47 functions as a second electrical component holding portion. However, electrical components held by the first and second electrical component holding portions do not need to be the choke coils 37 or the capacitor 46.

In the embodiment of FIGS. 1 to 8, the brush holding members 51 are assembled to the brush holder main body 50 along the axial direction of the rotary shaft 6. However, the direction in which the brush holding members 51 are assembled is not limited to this.

What is claimed is:

1. A brush holder comprising:
a brush holding portion that holds a brush such that the brush is slidable on a commutator attached to a rotary shaft;
an electrical component holding portion that holds an electrical component electrically connected to the brush; and
a holder base member and a brush holding member that is assembled to the holder base member so as to firm the brush holding portion;
wherein the holder base member and the brush holding member are independent of each other and wherein the brush holding member is integrally formed with an electrical component supporting portion, the electrical component supporting portion forming the electrical component holding portion between the brush holding member and the holder base member;
wherein the holder base member includes an electrical component accommodating portion that accommodates an electrical component; and
wherein, when the brush holding member is assembled to the holder base member along an axial direction of the rotary shaft, the electrical component is held in the electrical component holding portion and between the electrical component accommodating portion and the electrical component supporting portion.

2. The brush holder according to claim 1,
wherein the brush holding member is assembled to the holder base member along a predetermined assembling direction, wherein the brush holding member has a sliding portion on an advancing side in the assembling direction, the brush being slidable on the sliding portion, and wherein brush holding member has a second electrical component holding portion on a trailing side in the assembling direction, the second electrical component holding portion holding a second electrical component that is different from said electrical component.

3. The brush holder according to claim 2,
wherein the sliding portion includes a retailing portion that restricts movement of the brush in a direction opposite to the direction toward an accommodating space for accommodating the commutator.

4. A method for manufacturing a brush holder, the brush holder including:
a brush holding portion that holds a brush such that the brush is slidable on a commutator attached to a rotary shaft; and an electrical component holding position portion that holds an electrical component, electrically connected to the brush, the method comprising:

arranging the brush and the electrical component in a holder base member;

preparing a brush holding portion that has a sliding portion, on which the brush is slidable, and an electrical component supporting portion for supporting an electrical component electrically connected to the brush;

forming a recess in the holder base member;

independently forming the holder base member and the brush holding member; and assembling the brush holding member to the holder base member by inserting a portion of the brush holding member into the recess, thereby integrally forming the brush holding portion and the electrical component holding portion.

* * * * *